(12) United States Patent
Nazarpoor et al.

(10) Patent No.: US 9,555,400 B2
(45) Date of Patent: *Jan. 31, 2017

(54) SYNERGIZED PGM CATALYST SYSTEMS INCLUDING PLATINUM FOR TWC APPLICATION

(71) Applicant: Clean Diesel Technologies, Inc., Oxnard, CA (US)

(72) Inventors: Zahra Nazarpoor, Camarillo, CA (US); Stephen J. Golden, Santa Barbara, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,587

(22) Filed: Feb. 24, 2014

(65) Prior Publication Data

US 2015/0238941 A1    Aug. 27, 2015

(51) Int. Cl.
*B01J 21/00* (2006.01)
*B01J 23/00* (2006.01)
(Continued)

(52) U.S. Cl.
CPC .......... *B01J 23/8986* (2013.01); *B01D 53/945* (2013.01); *B01J 23/005* (2013.01);
(Continued)

(58) Field of Classification Search
USPC ................... 502/324, 100, 300, 308
See application file for complete search history.

(56) References Cited

U.S. PATENT DOCUMENTS 3,284,370 A    11/1966   Alan et al.
3,473,987 A    10/1969   Sowards
(Continued)

FOREIGN PATENT DOCUMENTS

CH           644637 A5    8/1984
CN          102172527     9/2011
(Continued)

OTHER PUBLICATIONS

Alini, S. et al., *Development of new catalysts for N2O-decomposition from adipic acid plant,* Applied Catalysis B: Environmental, 70, (2007) 323-329.
(Continued)

*Primary Examiner* — James McDonough
(74) *Attorney, Agent, or Firm* — Alston & Bird LLP

(57) ABSTRACT

Synergized Platinum Group Metals (SPGM) catalyst system for TWC application is disclosed. Disclosed SPGM catalyst system may include a washcoat that includes stoichiometric Cu—Mn spinel structure, supported on doped $ZrO_2$, and an overcoat that includes PGM, such as platinum (Pt) supported on carrier material oxides, such as alumina. SPGM catalyst system shows significant improvement in nitrogen oxide reduction performance under lean and also rich operating conditions. Additionally, disclosed SPGM catalyst system exhibits enhanced catalytic activity for carbon monoxide conversion. Furthermore, disclosed SPGM catalyst systems are found to have enhanced catalytic activity compared to PGM catalyst system, showing that there is a synergistic effect between PGM catalyst, such as Pt, and Cu—Mn spinel within disclosed SPGM catalyst system, which help in activity and thermal stability of disclosed SPGM catalyst.

15 Claims, 7 Drawing Sheets

(51) Int. Cl.
| | |
|---|---|
| *B01J 25/00* | (2006.01) |
| *B01J 29/00* | (2006.01) |
| *B01J 23/32* | (2006.01) |
| *B01J 23/89* | (2006.01) |
| *B01J 23/889* | (2006.01) |
| *B01J 37/02* | (2006.01) |
| *B01D 53/94* | (2006.01) |
| *B01J 37/03* | (2006.01) |

(52) U.S. Cl.
CPC ....... *B01J 23/8892* (2013.01); *B01J 37/0244* (2013.01); *B01D 2255/1021* (2013.01); *B01D 2255/1023* (2013.01); *B01D 2255/1025* (2013.01); *B01D 2255/2073* (2013.01); *B01D 2255/20715* (2013.01); *B01D 2255/20761* (2013.01); *B01D 2255/405* (2013.01); *B01D 2255/908* (2013.01); *B01D 2255/9022* (2013.01); *B01D 2258/012* (2013.01); *B01J 37/035* (2013.01); *B01J 37/038* (2013.01); *B01J 2523/00* (2013.01); *Y02T 10/22* (2013.01)

(56) References Cited

U.S. PATENT DOCUMENTS

| | | |
|---|---|---|
| 3,493,325 A | 2/1970 | Roth |
| 3,896,616 A | 7/1975 | Keith et al. |
| 3,904,553 A | 9/1975 | Campbell et al. |
| 4,029,738 A | 6/1977 | Courty et al. |
| 4,062,810 A | 12/1977 | Vogt et al. |
| 4,113,921 A | 9/1978 | Goldstein et al. |
| 4,188,309 A | 2/1980 | Volker et al. |
| 4,199,328 A | 4/1980 | Cole et al. |
| 4,261,862 A | 4/1981 | Kinoshita et al. |
| 4,274,981 A | 6/1981 | Suzuki et al. |
| 4,297,150 A | 10/1981 | Sims et al. |
| 4,297,328 A | 10/1981 | Ritscher et al. |
| 4,414,023 A | 11/1983 | Aggen et al. |
| 4,629,472 A | 12/1986 | Haney, III et al. |
| 4,661,329 A | 4/1987 | Suzuki et al. |
| 4,673,556 A | 6/1987 | McCabe et al. |
| 4,790,982 A | 12/1988 | Yoo et al. |
| 4,797,329 A | 1/1989 | Kilbane et al. |
| 4,885,269 A | 12/1989 | Cyron |
| 4,891,050 A | 1/1990 | Bowers et al. |
| 4,892,562 A | 1/1990 | Bowers et al. |
| 4,906,443 A | 3/1990 | Gandhi et al. |
| 5,034,020 A | 7/1991 | Epperly et al. |
| 5,063,193 A | 11/1991 | Bedford et al. |
| 5,157,007 A | 10/1992 | Domesle et al. |
| 5,162,284 A | 11/1992 | Soled et al. |
| 5,168,836 A | 12/1992 | Kraus |
| 5,175,132 A | 12/1992 | Ketcham et al. |
| 5,182,249 A | 1/1993 | Wang et al. |
| 5,203,166 A | 4/1993 | Miller |
| 5,238,898 A | 8/1993 | Han et al. |
| 5,266,083 A | 11/1993 | Peter-Hoblyn et al. |
| 5,364,517 A | 11/1994 | Dieckmann et al. |
| 5,371,056 A | 12/1994 | Leyrer et al. |
| 5,404,841 A | 4/1995 | Valentine |
| 5,501,714 A | 3/1996 | Valentine et al. |
| 5,535,708 A | 7/1996 | Valentine |
| 5,580,553 A | 12/1996 | Nakajima |
| 5,584,894 A | 12/1996 | Peter-Hoblyn et al. |
| 5,658,543 A | 8/1997 | Yoshida et al. |
| 5,693,106 A | 12/1997 | Peter-Hoblyn et al. |
| 5,708,233 A | 1/1998 | Ochi et al. |
| 5,721,188 A | 2/1998 | Sung et al. |
| 5,732,548 A | 3/1998 | Peter-Hoblyn et al. |
| 5,743,922 A | 4/1998 | Peter-Hoblyn et al. |
| 5,747,410 A | 5/1998 | Muramatsu et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn |
| 5,868,421 A | 2/1999 | Eyrainer |
| 5,879,645 A | 3/1999 | Park et al. |
| 5,898,015 A | 4/1999 | Yokoi et al. |
| 5,921,080 A | 7/1999 | Ulmet et al. |
| 5,924,280 A | 7/1999 | Tarabulski |
| 5,939,354 A | 8/1999 | Golden |
| 5,965,099 A | 10/1999 | Hartweg et al. |
| 5,968,462 A | 10/1999 | Suzuki |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,129,834 A | 10/2000 | Peters et al. |
| 6,203,770 B1 | 3/2001 | Peter-Hoblyn et al. |
| 6,232,253 B1 | 5/2001 | Narula |
| 6,279,603 B1 | 8/2001 | Czarnik et al. |
| 6,293,096 B1 | 9/2001 | Khair et al. |
| 6,352,955 B1 | 3/2002 | Golden |
| 6,361,754 B1 | 3/2002 | Peter-Hoblyn et al. |
| 6,372,686 B1 | 4/2002 | Golden |
| 6,395,244 B1 | 5/2002 | Hartweg et al. |
| 6,444,178 B1 | 9/2002 | Hartweg et al. |
| 6,468,941 B1 | 10/2002 | Bortun et al. |
| 6,531,425 B2 | 3/2003 | Golden |
| 6,576,587 B2 | 6/2003 | Labarge et al. |
| 6,605,264 B2 | 8/2003 | Bortun et al. |
| 6,624,113 B2 | 9/2003 | Labarge et al. |
| 6,632,557 B1 | 10/2003 | Curelop et al. |
| 6,652,829 B2 | 11/2003 | Barnes et al. |
| 6,696,389 B1 | 2/2004 | Boegner et al. |
| 6,747,180 B2 | 6/2004 | Ostgard et al. |
| 6,774,080 B2 | 8/2004 | LaBarge et al. |
| 6,858,193 B2 | 2/2005 | Ruwisch et al. |
| 6,915,629 B2 | 7/2005 | Szymkowicz |
| 6,938,411 B2 | 9/2005 | Hoffmann et al. |
| 6,948,926 B2 | 9/2005 | Valentine et al. |
| 7,014,825 B2 | 3/2006 | Golden |
| 7,129,194 B2 | 10/2006 | Baca et al. |
| 7,374,729 B2 | 5/2008 | Chen et al. |
| 7,393,809 B2 | 7/2008 | Kim |
| 7,485,273 B2 | 2/2009 | Gandhi et al. |
| 7,563,744 B2 | 7/2009 | Klein et al. |
| 7,576,029 B2 | 8/2009 | Saito et al. |
| 7,641,875 B1 * | 1/2010 | Golden ................ B01D 53/945 423/213.5 |
| 7,749,472 B2 | 7/2010 | Chen et al. |
| 7,772,147 B2 | 8/2010 | Collier et al. |
| 7,785,544 B2 | 8/2010 | Alward et al. |
| 7,803,338 B2 | 9/2010 | Socha et al. |
| 7,875,250 B2 | 1/2011 | Nunan |
| 7,875,573 B2 | 1/2011 | Beutel et al. |
| 7,943,104 B2 | 5/2011 | Kozlov et al. |
| 8,080,494 B2 | 12/2011 | Yasuda et al. |
| 8,148,295 B2 | 4/2012 | Augustine |
| 8,158,551 B2 | 4/2012 | Verdier et al. |
| 8,168,125 B2 | 5/2012 | Choi |
| 8,242,045 B2 | 8/2012 | Kulkarni et al. |
| 8,318,629 B2 | 11/2012 | Alive et al. |
| 8,802,582 B2 | 8/2014 | Malyala et al. |
| 8,845,987 B1 * | 9/2014 | Nazarpoor ............ B01J 23/898 423/213.2 |
| 8,853,121 B1 | 10/2014 | Nazarpoor et al. |
| 8,858,903 B2 | 10/2014 | Nazarpoor |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2002/0114746 A1 | 8/2002 | Roark et al. |
| 2002/0131914 A1 | 9/2002 | Sung |
| 2003/0092566 A1 | 5/2003 | Inoue et al. |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |

(56) References Cited

U.S. PATENT DOCUMENTS

| | | |
|---|---|---|
| 2003/0198582 A1 | 10/2003 | Golden |
| 2003/0221360 A1 | 12/2003 | Brown et al. |
| 2004/0018939 A1 | 1/2004 | Chigapov et al. |
| 2004/0033175 A1 | 2/2004 | Ohno et al. |
| 2004/0048125 A1 | 3/2004 | Curelop et al. |
| 2004/0087439 A1 | 5/2004 | Hwang et al. |
| 2004/0098905 A1 | 5/2004 | Valentine et al. |
| 2004/0151647 A1 | 8/2004 | Wanninger et al. |
| 2004/0166035 A1 | 8/2004 | Noda et al. |
| 2004/0172876 A1 | 9/2004 | Sprague et al. |
| 2004/0254062 A1 | 12/2004 | Crocker et al. |
| 2005/0095188 A1 | 5/2005 | Matsumoto et al. |
| 2005/0132674 A1 | 6/2005 | Toyoda et al. |
| 2005/0145827 A1 | 7/2005 | McCabe et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0197244 A1 | 9/2005 | L'vovich et al. |
| 2005/0207956 A1 | 9/2005 | Vierheilig |
| 2005/0217751 A1 | 10/2005 | Valentine et al. |
| 2005/0227867 A1 | 10/2005 | Chen et al. |
| 2005/0265920 A1 | 12/2005 | Ercan et al. |
| 2006/0081922 A1 | 4/2006 | Golden |
| 2006/0100097 A1 | 5/2006 | Chigapov et al. |
| 2006/0120936 A1 | 6/2006 | Alive et al. |
| 2006/0166816 A1 | 7/2006 | Zhang et al. |
| 2006/0223694 A1 | 10/2006 | Gandhi et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2006/0292342 A1 | 12/2006 | Ohno et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0072705 A1 | 3/2008 | Chaumonnot et al. |
| 2008/0075646 A1 | 3/2008 | Mussmann et al. |
| 2008/0119353 A1 | 5/2008 | Jia et al. |
| 2008/0125308 A1 | 5/2008 | Fujdala et al. |
| 2008/0166282 A1 | 7/2008 | Golden et al. |
| 2008/0190099 A1 | 8/2008 | Yezerets et al. |
| 2008/0210184 A1 | 9/2008 | Valentine et al. |
| 2008/0226524 A1 | 9/2008 | Alive et al. |
| 2009/0004083 A1 | 1/2009 | Valentine et al. |
| 2009/0134365 A1 | 5/2009 | Sasaki et al. |
| 2009/0220697 A1 | 9/2009 | Addiego |
| 2009/0274903 A1 | 11/2009 | Addiego |
| 2009/0304566 A1 | 12/2009 | Golden et al. |
| 2009/0324468 A1* | 12/2009 | Golden ............... B01D 53/945 423/210 |
| 2009/0324469 A1* | 12/2009 | Golden ............... B01D 53/945 423/212 |
| 2009/0324470 A1 | 12/2009 | Alamdari et al. |
| 2010/0062293 A1 | 3/2010 | Triantafyllopoulos et al. |
| 2010/0111796 A1 | 5/2010 | Caudle et al. |
| 2010/0152032 A1 | 6/2010 | Galligan |
| 2010/0168449 A1 | 7/2010 | Grey et al. |
| 2010/0180581 A1 | 7/2010 | Grubert et al. |
| 2010/0184590 A1 | 7/2010 | Althofer et al. |
| 2010/0193104 A1 | 8/2010 | Ryu et al. |
| 2010/0229533 A1 | 9/2010 | Li et al. |
| 2010/0233045 A1 | 9/2010 | Kim et al. |
| 2010/0240525 A1 | 9/2010 | Golden et al. |
| 2010/0266473 A1 | 10/2010 | Chen et al. |
| 2010/0290964 A1 | 11/2010 | Southward et al. |
| 2010/0293929 A1 | 11/2010 | Zhan et al. |
| 2010/0316545 A1 | 12/2010 | Alive et al. |
| 2010/0316547 A1 | 12/2010 | Justice et al. |
| 2011/0053763 A1 | 3/2011 | Verdier et al. |
| 2011/0150742 A1 | 6/2011 | Han et al. |
| 2011/0239626 A1 | 10/2011 | Makkee et al. |
| 2012/0015801 A1 | 1/2012 | Deprez et al. |
| 2012/0039775 A1 | 2/2012 | Schirmeister et al. |
| 2012/0183447 A1 | 7/2012 | Kwan et al. |
| 2013/0012378 A1 | 1/2013 | Meyer et al. |
| 2013/0058848 A1 | 3/2013 | Nunan et al. |
| 2013/0115144 A1 | 5/2013 | Golden et al. |
| 2013/0130032 A1 | 5/2013 | Kuo et al. |
| 2013/0172177 A1 | 7/2013 | Domke et al. |
| 2013/0189173 A1 | 7/2013 | Hilgendorff |
| 2013/0236380 A1 | 9/2013 | Golden et al. |
| 2013/0323145 A1 | 12/2013 | Tran et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274663 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor et al. |
| 2015/0005159 A1 | 1/2015 | Nazarpoor |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor |
| 2015/0182954 A1 | 7/2015 | Nazarpoor |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor et al. |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |

(56) References Cited

U.S. PATENT DOCUMENTS

| | | | |
|---|---|---|---|
| 2016/0023188 | A1 | 1/2016 | Nazarpoor et al. |
| 2016/0030885 | A1 | 2/2016 | Hatfield |
| 2016/0047751 | A1 | 2/2016 | Pless et al. |
| 2016/0082422 | A1 | 3/2016 | Nazarpoor |
| 2016/0121304 | A1 | 5/2016 | Nazarpoor |
| 2016/0121308 | A1 | 5/2016 | Nazarpoor et al. |
| 2016/0121309 | A1 | 5/2016 | Nazarpoor et al. |
| 2016/0136617 | A1 | 5/2016 | Nazarpoor et al. |
| 2016/0136618 | A1 | 5/2016 | Nazarpoor et al. |
| 2016/0136619 | A1 | 5/2016 | Nazarpoor et al. |
| 2016/0136620 | A1 | 5/2016 | Nazarpoor et al. |
| 2016/0136621 | A1 | 5/2016 | Nazarpoor et al. |
| 2016/0167023 | A1 | 6/2016 | Nazarpoor et al. |
| 2016/0167024 | A1 | 6/2016 | Nazarpoor et al. |

FOREIGN PATENT DOCUMENTS

| | | |
|---|---|---|
| CN | 102371153 | 3/2012 |
| EP | 0022349 | 1/1981 |
| EP | 0450897 | 10/1991 |
| EP | 0541271 | 5/1993 |
| EP | 0605142 | 7/1994 |
| EP | 0 814 241 | 12/1997 |
| EP | 1121981 | 8/2001 |
| EP | 1 232 790 | 8/2002 |
| EP | 1 256 382 | 11/2002 |
| EP | 1 656 993 | 5/2006 |
| EP | 2441510 | 4/2012 |
| JP | 62-20613 | 1/1987 |
| JP | 4-215853 | 8/1992 |
| JP | 09-271665 | 10/1997 |
| JP | 4144174 | 9/2008 |
| JP | 2013-27858 | 2/2013 |
| PL | 404146 | 12/2014 |
| WO | WO 90/07561 | 7/1990 |
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/85876 A1 | 11/2001 |
| WO | WO 03/068363 A1 | 8/2003 |
| WO | WO 2004/058641 A1 | 7/2004 |
| WO | WO 2008/099847 | 8/2008 |
| WO | WO 2009/139860 A1 | 11/2009 |
| WO | WO 2010/029431 | 3/2010 |
| WO | WO 2011/068509 A1 | 6/2011 |
| WO | WO 2012/093600 | 7/2012 |
| WO | WO 2012/166514 | 12/2012 |
| WO | WO 2013/004814 | 1/2013 |
| WO | WO 2013/028575 | 2/2013 |
| WO | WO 2013/044115 | 3/2013 |
| WO | WO 2013/068243 | 5/2013 |
| WO | WO 2013/121112 | 8/2013 |
| WO | WO 2013/153081 | 10/2013 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |

OTHER PUBLICATIONS

Azad et al., *Examining the Cu—Mn—O Spinel System as an Oxygen Carrier in Chemical Looping Combustion*, Energy Technology, vol. 1, Issue 1, (2013) 59-69.
Barrett, E. P. et al., *The determination of pore volume and area distributions in porous substances. I. Computations from nitrogen isotherms*, J. A. Chem. Soc. (1951) 73, 373-.
Brunaubr, S. et al., *Adsorption of Gases in Multimolecular Layers*, J. Am. Chem. Soc. 1938, 60, 309-319.
Bugarski, Aleksandar, *Exhaust Aftertreatment Technologies for Curtailment of Diesel Particulate Matter and Gaseous Emissions*, Disesel Aerosols and Gases in Underground.
D. Panayotov, "Interaction Between NO, CO and O2 on gamma-AL203-Supported Copper-Manganese Oxides", 1996, React.Kinet.Catal.Lett. Vol.
Extended European Search Report for corresponding European Application No. 09770546.1 dated Sep. 26, 2012, 6 pages.
Extended European Search Report for corresponding European Application No. 09770547.9 dated Dec. 7, 2012, 5 pages.
Hayes et al., "Introduction to Catalytic Combustion", pp. 310-313, 1997 OPA (Overseas Publishers Association).
He, H. et al., *An investigation of NO/CO reaction over perovskite-type oxide La0.8Ce0.2B0.4Mn0.6O3 (B=Cu or Ag) catalysts synthesized by reverse microemulsion*.
International Preliminary Report on Patentability (Chapter II) from International Application No. PCT/US2009/003800, dated May 11, 2010.
International Search Report and Written Opinion for corresponding International Application No. PCT/US2009/003799, dated Oct. 8, 2009.
International Search Report and Written Opinion for corresponding International Application No. PCT/US2009/003800 dated Oct. 22, 2009.
International Search Report and Written Opinion for corresponding International Application No. PCT/US2014/030597 dated Aug. 13, 2014.
International Search Report and Written Opinion for corresponding International Application No. PCT/US2014/033041 dated Aug. 20, 2014.
International Search Report and Written Opinion for corresponding International Application No. PCT/US2014/037452 dated Sep. 15, 2014.
International Search Report and Written Opinion for corresponding International Application No. PCT/US2014/044221, dated Oct. 3, 2014.
International Search Report and Written Opinion for corresponding International Application No. PCT/US2014/044222 dated Oct. 3, 2014.
International Search Report and Written Opinion for corresponding International Application No. PCT/US2014/046512 dated Apr. 6, 2015.
International Search Report and Written Opinion for corresponding International Application No. PCT/US2014/054874, dated Nov. 13, 2014.
International Search Report and Written Opinion for corresponding International Application No. PCT/US2014/055063 dated Nov. 24, 2014.
International Search Report and Written Opinion for corresponding International Application No. PCT/US2014/067541 dated Feb. 4, 2015.
International Search Report and Written Opinion for corresponding International Application No. PCT/US2014/067569, dated Apr. 3, 2015.
International Search Report and Written Opinion for corresponding International Application No. PCT/US2014/067589, dated Feb. 10, 2015.
International Search Report and Written Opinion for corresponding International Application No. PCT/US2015/025267 dated Jul. 2, 2015.
International Search Report and Written Opinion for corresponding International Application No. PCT/US2015/025299 dated Jul. 2, 2015.
Ishizaki, K. et al., *A Study of PGM-Free Oxidation Catalyst YMnO3 for Diesel Exhaust Aftertreatment*, SAE Technical Paper, (2012) http://papers.sae.org/2012-01-0365/.
K.S. Abdel Halim et al. "Cataltic Oxidation of CO Gas over Nanocrystallite CuxMn 1-xFe2O4", Feb. 26, 2008, Top Catalyst (2008) 47:66-72.

(56) References Cited

OTHER PUBLICATIONS

Kurcharczyk, B. et al., *Partial substitution of lanthanum with silver in the LaMnO3 perovskite: Effect of the modification on the activity of monolithic catalysts in the.*

Mestres, L. et al., *Phase Diagram at Low Temperature of the System ZrO2/Nb2O5*, Z.Anorg. Alig. Chem., vol. 627 (2001) 294-298.

Papavasilious et al., "Combined Steam reforming of methanol over Cu-Mn spinel oxide Catalysts", Journal of Catalysis 251 (2007) 7-20.

Reddy et al., *Selective Ortho-Methylation of Phenol with Methanol over Copper Manganese Mixed-Oxide Spinel Catalysts*, Journal of Catalysis, vol. 243 (2006) 278-291.

Suh, J. K. et al., *Characterization of transition metal-impregnated La-Al complex oxides for catalytic combustion*, Microporous Materials (1995) 657-664.

Tanaka et al., "Influence of preparation method and additive for Cu-Mn spinel oxide catalyst on water gas shift reaction of reformed fuels", Applied Catalysis A: General 279.

Wei, P. et al., *In situ high-temperature X-ray and neutron diffraction of Cu-Mn oxide phases*, J. Mater Sci. (2010) 45: 1056-1064.

\* cited by examiner

SYNERGIZED PGM CATALYST SYSTEMS INCLUDING PLATINUM FOR TWC APPLICATION

CROSS-REFERENCE TO RELATED APPLICATIONS

This application is related to U.S. patent application Ser. No. 14/090,861, filed Nov. 26, 2013, entitled System and Methods for Using Synergized PGM as a Three-Way Catalyst.

BACKGROUND

Technical Field

The present disclosure relates generally to PGM catalyst systems, and, more particularly, to synergized PGM catalyst systems.

Background Information

Catalysts in catalytic converters have been used to decrease the pollution caused by exhaust from various sources, such as automobiles, utility plants, processing and manufacturing plants, airplanes, trains, all-terrain vehicles, boats, mining equipment, and other engine-equipped machines. Important pollutants in the exhaust gas of internal combustion engines may include carbon monoxide (CO), unburned hydrocarbons (HC), nitrogen oxides ($NO_x$), and particulate matter (PM). Several oxidation and reduction reactions take place in the catalytic converter, which is capable of removing the major pollutants HC, CO and $NO_x$ simultaneously, therefore, it is called a three-way catalyst.

Catalytic converters are generally fabricated using at least some platinum group metals (PGM). With the ever stricter standards for acceptable emissions, the demand on PGM continues to increase due to their efficiency in removing pollutants from exhaust. However, this demand, along with other demands for PGM, places a strain on the supply of PGM, which in turn drives up the cost of PGM and therefore catalysts and catalytic converters. Additionally, engines associated with TWC using PGM operate at or near stoichiometric conditions.

Catalytic materials used in TWC applications have also changed, and the new materials have to be thermally stable under the fluctuating exhaust gas conditions. The attainment of the requirements regarding the techniques to monitor the degree of the catalyst's deterioration/deactivation demands highly active and thermally stable catalysts in which fewer constituents may be provided to reduce manufacturing costs, offer additional economic alternatives, and maintain high performance materials with optimal thermal stability and enhanced performance due to its facile nature of the redox function of the used chemical components.

For the foregoing reasons, there is a need for combined catalyst systems that include low amounts of PGM catalysts, which may have facile nature of the redox function of the used chemical components, and which may exhibit optimal synergistic behavior yielding enhanced activity and performance under both lean condition and rich condition.

SUMMARY

The present disclosure provides Synergized Platinum Group Metals (SPGM) catalyst systems which may exhibit high catalytic activity, under both lean condition and rich condition, and thus enhanced $NO_x$, and CO conversion compared to PGM catalyst systems.

According to an embodiment, SPGM catalyst system may include at least a substrate, a washcoat, and an overcoat, where substrate may include a ceramic material, washcoat may include a Cu—Mn spinel structure, $Cu_xMn_{3-x}O_4$, supported on doped-$ZrO_2$, and overcoat may include PGM catalyst, such as Platinum (Pt) supported on carrier material oxides. Suitable carrier material oxides may be alumina.

In order to compare performance and determine synergism of Cu—Mn spinel structure with Pt catalyst, a PGM catalyst system without Cu—Mn spinel structure may be prepared, where PGM catalyst system may include a ceramic material, a washcoat that may include doped-$ZrO_2$, and an overcoat that may include a PGM catalyst, such as Pt supported on carrier material oxides. Suitable carrier material oxides may be alumina.

Disclosed SPGM catalyst system may be prepared using suitable known in the art synthesis method, such as co-milling process, and co-precipitation process, among others.

According to one aspect of the present disclosure, fresh and aged samples of disclosed SPGM catalyst system and of PGM catalyst system may be prepared, including about 1 g/ft³ of Pt in overcoat, in order to compare catalytic activity of disclosed SPGM catalyst system (including Cu—Mn spinel) with PGM catalyst systems (without Cu—Mn spinel).

Catalytic activity in fresh, hydrothermally aged (900° C. during about 4 hours), and fuel cut aged (800° C. during about 20 hours) samples of disclosed SPGM catalyst system and of PGM catalyst system may be determined by performing isothermal steady state sweep tests under stoichiometric conditions, in a range of rich to lean conditions, and compared with results for disclosed SPGM catalyst system with PGM catalyst systems.

SPGM catalyst system of the present disclosure may show surprisingly significant improvement in nitrogen oxide conversion under stoichiometric operating conditions and especially under lean operating conditions which may allow reduced consumption of fuel. It has been shown that the enhanced catalytic activity is produced by the synergistic effect of Cu—Mn spinel on Pt (PGM catalyst). Furthermore, disclosed SPGM catalyst system that includes a Cu—Mn spinel may enable the use of a catalyst converter that includes low amounts of PGM.

Numerous other aspects, features and benefits of the present disclosure may be made apparent from the following detailed description taken together with the drawing figures.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
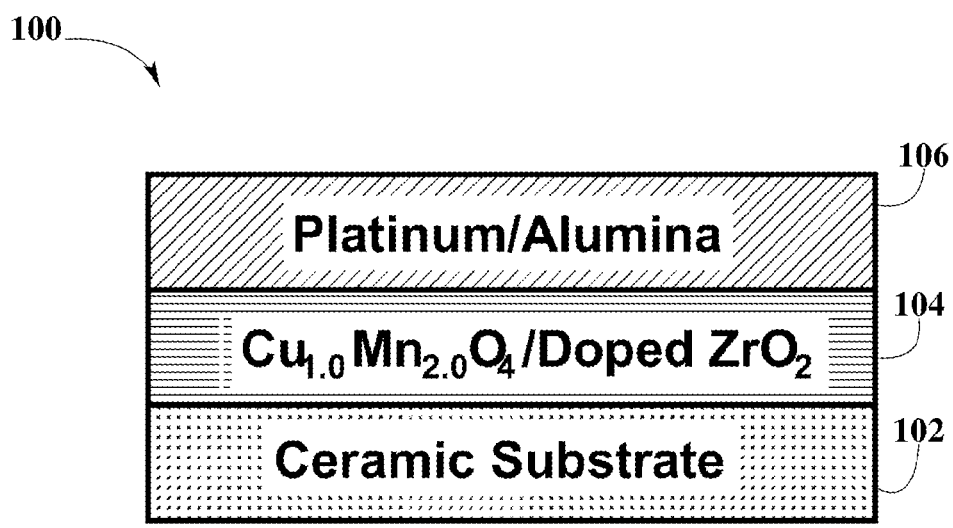
FIG. 1 shows a SPGM catalyst system configuration including Cu—Mn spinel referred as SPGM catalyst system Type 1, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

DEFINITIONS

As used here, the following terms may have the following definitions:

"Catalyst system" refers to a system of at least two layers including at least one substrate, a washcoat, and/or an overcoat.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat layer.

"Catalyst" refers to one or more materials that may be of use in the conversion of one or more other materials.

"Milling" refers to the operation of breaking a solid material into a desired grain or particle size.

"Co-precipitation" refers to the carrying down by a precipitate of substances normally soluble under the conditions employed.

"Calcination" refers to a thermal treatment process applied to solid materials, in presence of air, to bring about a thermal decomposition, phase transition, or removal of a volatile fraction at temperatures below the melting point of the solid materials.

"Platinum group metals (PGM)" refers to platinum, palladium, ruthenium, iridium, osmium, and rhodium.

"Synergized platinum group metal (SPGM) catalyst" refers to a PGM catalyst system which is synergized by a non-PGM group metal compound under different configuration.

"Zero Platinum group metals (ZPGM)" refers to catalyst system that is free of PGM.

"Treating," "treated," or "treatment" refers to drying, firing, heating, evaporating, calcining, or mixtures thereof.

"Three-Way Catalyst" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

"R-Value" refers to the number obtained by dividing the reducing potential by the oxidizing potential.

"Lean condition" refers to exhaust gas condition with an R-value below 1.

"Rich condition" refers to exhaust gas condition with an R value above 1.

"Stoichiometric condition" refers to the condition when the oxygen of the combustion gas or air added equals the amount for completely combusting the fuel.

"Conversion" refers to the chemical alteration of at least one material into one or more other materials.

"Spinel" refers to any of various mineral oxides of magnesium, iron, zinc, or manganese in combination with aluminum, chromium, copper or iron with $AB_2O_4$ structure.

DESCRIPTION OF THE DRAWINGS

The present disclosure may provide a synergized PGM (SPGM) catalyst system which may have enhanced catalytic performance of PGM catalyst under lean condition or rich condition, by incorporating more active components into phase materials possessing three-way catalyst (TWC) properties.

Embodiments of the present disclosure provide catalyst performance comparison of disclosed SPGM catalyst system and a PGM catalyst system that may include Platinum (Pt) within the overcoat of disclosed SPGM catalyst systems, and within the PGM catalyst system.

According to embodiments in the present disclosure, SPGM catalyst systems may be configured with a washcoat including Cu—Mn stoichiometric spinel with doped $ZrO_2$ support oxide such as Niobium-Zirconia support oxide, an overcoat including a PGM catalyst, such as Pt with alumina-based support, and suitable ceramic substrate, here referred as SPGM catalyst system Type 1. According to embodiments in the present disclosure, PGM catalyst systems may be configured with washcoat layer including doped $ZrO_2$ support oxide such as Niobium-Zirconia support oxide, an overcoat including PGM catalyst, such as Pt with alumina-based support, and suitable ceramic substrate, here referred as PGM catalyst system Type 2.

Catalyst System Configuration

FIG. 1 shows a SPGM catalyst system configuration referred as SPGM catalyst system Type 1 100, according to an embodiment.

As shown in FIG. 1, SPGM catalyst system Type 1 100 may include at least a substrate 102, a washcoat 104, and an overcoat 106, where washcoat 104 may include a stoichiometric Cu—Mn spinel structure, $Cu_{1.0}Mn_{2.0}O_4$, supported on doped $ZrO_2$ and overcoat 106 may include PGM catalyst, such as Pt supported on carrier material oxides, such as alumina.

In an embodiment, substrate 102 materials for SPGM catalyst system Type 1 100 may include a refractive material, a ceramic material, a honeycomb structure, a metallic material, a ceramic foam, a metallic foam, a reticulated foam, or suitable combinations, where substrate 102 may have a plurality of channels with suitable porosity. Porosity may vary according to the particular properties of substrate 102 materials. Additionally, the number of channels may vary depending upon substrate 102 used as is known in the art. The type and shape of a suitable substrate 102 would be apparent to one of ordinary skill in the art. According to the present disclosure, preferred substrate 102 materials may be ceramic material.

According to an embodiment, washcoat 104 for SPGM catalyst system Type 1 100 may include a Cu—Mn stoichiometric spinel, $Cu_{1.0}Mn_{2.0}O_4$, as non PGM metal catalyst. Additionally, washcoat 104 may include support oxide such as zirconium oxide, doped zirconia. According to the present disclosure, suitable material for disclosed washcoat 104 may be $Nb_2O_5$—$ZrO_2$.

According to embodiments of the present disclosure, overcoat 106 for SPGM catalyst system Type 1 100 may include aluminum oxide, doped aluminum oxide, zirconium oxide, doped zirconia, titanium oxide, tin oxide, silicon dioxide, zeolite, and mixtures thereof. According to the present disclosure, most suitable material for disclosed overcoat 106 may be alumina ($Al_2O_3$). Additionally, overcoat 106 for SPGM catalyst system Type 1 100 may include a PGM catalyst, such as Palladium (Pd), Platinum (Pt), and Rhodium (Rh), among others. According to the present disclosure, most suitable PGM for disclosed overcoat 106 may be Pt.

Figure 2:
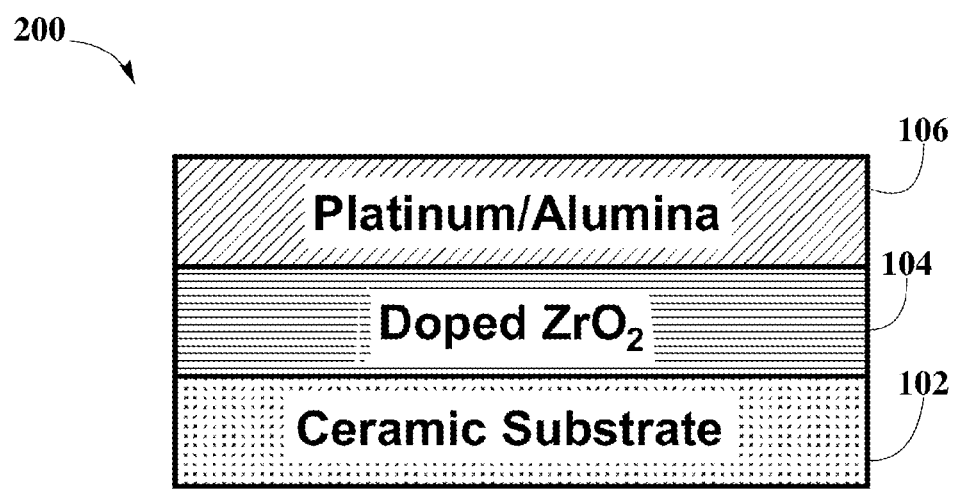
FIG. 2 illustrates a PGM catalyst system configuration with no Cu—Mn spinel referred as catalyst system Type 2, according to an embodiment.

FIG. 2 illustrates a PGM catalyst system configuration referred as PGM catalyst system Type 2 200, according to an embodiment.

As shown in FIG. 2, PGM catalyst system Type 2 200 may include at least a substrate 102, a washcoat 104, and an overcoat 106, where washcoat 104 may include doped $ZrO_2$ and overcoat 106 may include carrier material oxides, such as alumina mixed with a PGM catalyst, such as Pt.

In an embodiment, substrate 102 materials for PGM catalyst system Type 2 200 may include a refractive material, a ceramic material, a honeycomb structure, a metallic material, a ceramic foam, a metallic foam, a reticulated foam, or suitable combinations. According to the present disclosure, preferred substrate 102 materials may be ceramic material.

According to an embodiment, washcoat 104 for PGM catalyst system Type 2 200 may include support oxide such as zirconium oxide, doped zirconia. According to the present disclosure, suitable material for disclosed washcoat 104 may be $Nb_2O_5$—$ZrO_2$.

According to embodiments of the present disclosure, overcoat 106 for PGM catalyst system Type 2 200 may include aluminum oxide, doped aluminum oxide, zirconium oxide, doped zirconia, titanium oxide, tin oxide, silicon dioxide, zeolite, and mixtures thereof. According to the present disclosure, most suitable material for disclosed overcoat 106 may be alumina ($Al_2O_3$). Additionally, overcoat 106 for PGM catalyst system Type 2 200 may include a PGM catalyst, such as Pt.

According to embodiments of the present disclosure PGM catalyst system Type 2 200 has the same configuration as SPGM catalyst system Type 1 100 in which Cu—Mn spinel is removed from washcoat 104, in order to demonstrate the effect of addition of Cu—Mn spinel to PGM catalyst system Type 2 200.

Preparation of SPGM Catalyst System Type 1 (with Cu—Mn Spinel)

The preparation of washcoat 104 may begin by milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

The Cu—Mn solution may be prepared by mixing for about 1 to 2 hours, an appropriate amount of Mn nitrate solution and Cu nitrate solution. Subsequently, Cu—Mn nitrate solution may be mixed with $Nb_2O_5$—$ZrO_2$ support oxide slurry for about 2 to 4 hours, where Cu—Mn nitrate solution may be precipitated on $Nb_2O_5$—$ZrO_2$ support oxide aqueous slurry. A suitable base solution may be added, such as sodium hydroxide (NaOH) solution, sodium carbonate ($Na_2CO_3$) solution, ammonium hydroxide ($NH_4OH$) solution, tetraethyl ammonium hydroxide (TEAH) solution, $(NH_4)_2CO_3$, other tetraalkylammonium salts, ammonium acetate, or ammonium citrate, amongst others, to adjust pH at desired level. The precipitated Cu—Mn/$Nb_2O_5$—$ZrO_2$ slurry may be aged for a period of time of about 12 to 24 hours under continued stirring at room temperature.

Subsequently, the precipitated slurry may be coated on substrate 102. The aqueous slurry of Cu—Mn/$Nb_2O_5$—$ZrO_2$ may be deposited on the suitable ceramic substrate 102 to form washcoat 104, employing vacuum dosing and coating systems. In the present disclosure, a plurality of capacities of washcoat 104 loadings may be coated on the suitable ceramic substrate 102. The plurality of washcoat 104 loading may vary from about 60 g/L to about 200 g/L, in the present disclosure particularly about 120 g/L. Subsequently, after deposition on ceramic substrate 102 of the suitable loadings of Cu—Mn/$Nb_2O_5$—$ZrO_2$ slurry, washcoat 104 may be dried overnight at about 120° C. and subsequently calcined at a suitable temperature within a range of about 550° C. to about 650° C., preferably at about 600° C. for about 5 hours. Treatment of washcoat 104 may be enabled employing suitable drying and heating processes. A commercially-available air knife drying systems may be employed for drying washcoat 104. Heat treatments (calcination) may be performed using commercially-available firing (furnace) systems.

Overcoat 106 may include a combination of Pt on alumina-based support. The preparation of overcoat 106 may begin by milling the alumina-based support oxide separately to make aqueous slurry. Subsequently, a solution of Pt nitrate may be mixed with the aqueous slurry of alumina with a loading within a range from about 0.5 g/ft³ to about 10 g/ft³. According to the present disclosure, suitable loading of Pt for disclosed SPGM Catalyst System Type 1 100 may be 1 g/ft³. Total loading of washcoat 104 material may be 120 g/L. After mixing of Pt and alumina slurry, Pt may be locked down with an appropriate amount of one or more base solutions, such as sodium hydroxide (NaOH) solution, sodium carbonate ($Na_2CO_3$) solution, ammonium hydroxide ($NH_4OH$) solution, tetraethyl ammonium hydroxide (TEAH) solution, among others. Then, the resulting slurry may be aged from about 12 hours to about 24 hours for subsequent coating as overcoat 106 on washcoat 104, dried and fired at about 550° C. for about 4 hours.

Preparation of PGM Catalyst System Type 2 (without Cu—Mn Spinel)

The preparation of washcoat 104 may begin by milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

Subsequently, washcoat 104 slurry may be coated on substrate 102. The washcoat 104 slurry may be deposited on the suitable ceramic substrate 102 to form washcoat 104, employing vacuum dosing and coating systems. In the present disclosure, a plurality of capacities of washcoat 104 loadings may be coated on suitable ceramic substrate 102. The plurality of washcoat 104 loading may vary from about 60 g/L to about 200 g/L, in the present disclosure particularly about 120 g/L. Washcoat 104 may be dried overnight at about 120° C. and subsequently calcined at a suitable temperature within a range of about 550° C. to about 650° C., preferably at about 550° C. for about 4 hours. Treatment of washcoat 104 may be enabled employing suitable drying and heating processes. A commercially-available air knife drying systems may be employed for drying washcoat 104. Heat treatments (calcination) may be performed using commercially-available firing (furnace) systems.

Overcoat 106 may include a combination of Pt on alumina-based support. The preparation of overcoat 106 may begin by milling the alumina-based support oxide separately to make aqueous slurry. Subsequently, a solution of Pt nitrate may be mixed with the aqueous slurry of alumina with a loading within a range from about 0.5 g/ft$^3$ to about 10 g/ft$^3$. According to the present disclosure, suitable loading of Pt for disclosed SPGM Catalyst System Type 1 100 may be 1 g/ft$^3$. Total loading of washcoat 104 material may be 120 g/L. After mixing of Pt and alumina slurry, Pt may be locked down with an appropriate amount of one or more base solutions, such as sodium hydroxide (NaOH) solution, sodium carbonate ($Na_2CO_3$) solution, ammonium hydroxide ($NH_4OH$) solution, tetraethyl ammonium hydroxide (TEAH) solution, among others. Then, the resulting slurry may be aged from about 12 hours to about 24 hours for subsequent coating as overcoat 106 on washcoat 104, dried and fired at about 550° C. for about 4 hours.

Catalytic performance, for SPGM Catalyst System Type 1 100 and PGM catalyst system Type 2 200 may be compared by preparing fresh and aged samples for each of the catalyst formulations and configurations in present disclosure to show the synergistic effect of adding Cu—Mn spinel to PGM catalyst materials which may be used in TWC applications.

In order to compare TWC performance of disclosed SPGM catalyst system Type 1 100 and PGM catalyst system Type 2 200, isothermal steady state sweep tests may be performed.

Isothermal Steady State Sweep Test Procedure

The isothermal steady state sweep test may be carried out employing a flow reactor in which the inlet temperature may be increased to about 450° C., and testing a gas stream at 11-point R-values from about 2.0 (rich condition) to about 0.80 (lean condition) to measure the CO, $NO_x$, and HC conversions.

The space velocity (SV) in the flow reactor may be adjusted at about 40,000 h$^{-1}$. The gas feed employed for the test may be a standard TWC gas composition, with variable $O_2$ concentration in order to adjust R-value from rich condition to lean condition during testing. The standard TWC gas composition may include about 8,000 ppm of CO, about 400 ppm of $C_3H_6$, about 100 ppm of $C_3H_8$, about 1,000 ppm of $NO_x$, about 2,000 ppm of $H_2$, 10% of $CO_2$, and 10% of $H_2O$. The quantity of $O_2$ in the gas mix may be varied to adjust R-value which is representative of Air/Fuel (A/F) ratio and to represent the three-way condition of the control loop.

NOx Conversion Comparison of SPGM Catalyst System Type 1 and PGM Catalyst System Type 2

Figure 3:
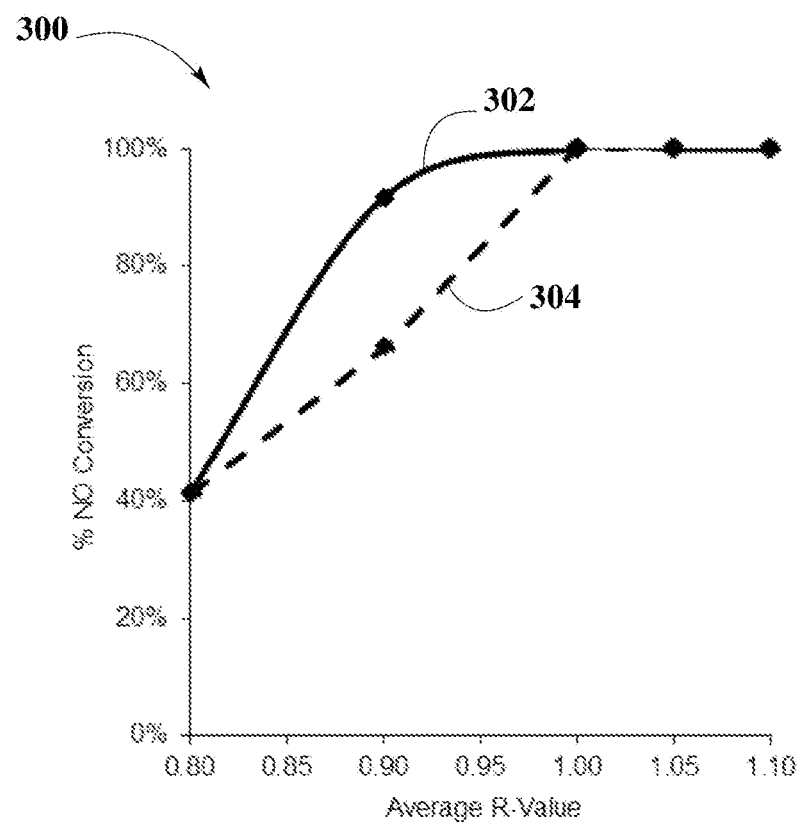
FIG. 3 depicts $NO_x$ conversion comparison for fresh samples of SPGM catalyst systems Type 1, and PGM catalyst system Type 2, under isothermal steady state sweep condition, at inlet temperature of about 450° C., and space velocity (SV) of about 40,000 h⁻¹, according to an embodiment.

FIG. 3 depicts NOx conversion comparison 300 for fresh samples of SPGM catalyst system Type 1 100 and fresh samples of PGM catalyst system Type 2 200, under isothermal steady state sweep condition, at inlet temperature of about 450° C. and SV of about 40,000 h$^{-1}$, according to an embodiment.

As may be observed in FIG. 3, NOx conversion curve 302 (solid line) depicts performance of SPGM catalyst system Type 1 100, and NO conversion curve 304 (dashed line) illustrates performance of PGM catalyst system Type 2 200, under isothermal steady state sweep condition.

As may be observed in NOx conversion comparison 300, disclosed SPGM catalyst system Type 1 100 may perform better than disclosed PGM catalyst system Type 2 200, because of their improved NO conversion under lean condition. For example, as shown in FIG. 3, at lean condition, R-value of about 0.9, while SPGM catalyst system Type 1 100 shows $NO_x$ conversion of about 91.7%, PGM catalyst system Type 2 200 shows $NO_x$ conversion of about 65.9%.

As may be seen in lean NOx conversion comparison 300, for fresh samples, there is an improved performance in $NO_x$ conversion for disclosed SPGM catalyst system Type 1 100, under lean condition (R-value<1.00) as compared to PGM catalyst system Type 2 200. This improved performance is the result of the synergistic effect between Pt, and the Cu—Mn spinel components in the respective composition of SPGM catalyst system Type 1 100, in which adding of Cu—Mn spinel components is responsible for the improved performance of $NO_x$ conversion under lean condition compared with the level of $NO_x$ conversion of PGM catalyst system Type 2 200 shown in NOx conversion comparison 300.

In addition, both fresh samples of SPGM catalyst system Type 1 100 and of PGM catalyst system Type 2 200 present $NO_x$ conversion of about 100% at R-value of about 1.00, which is the stoichiometric R-value for PGM catalysts.

Figure 4:
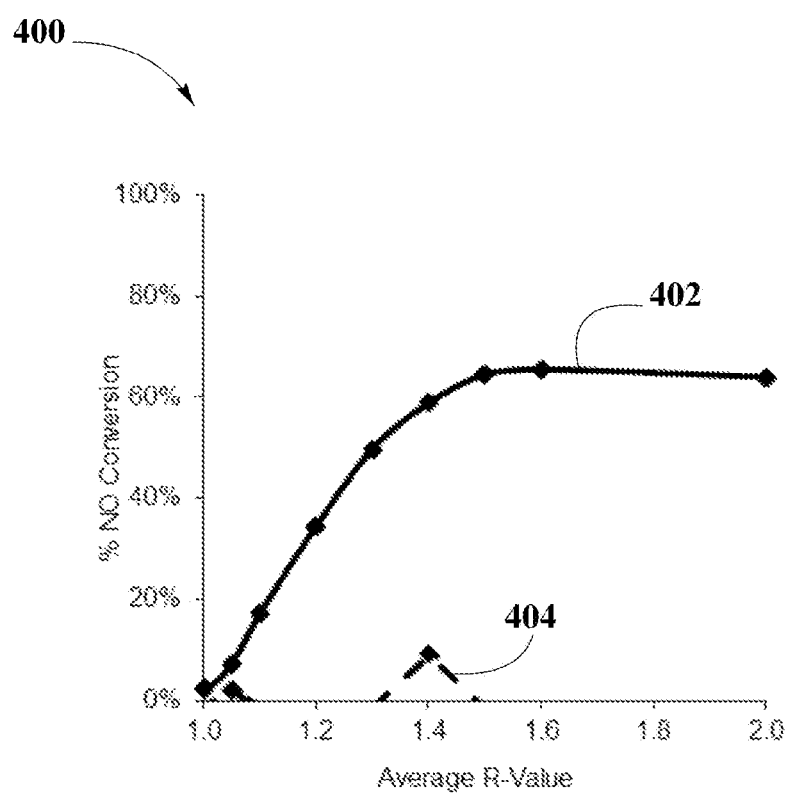
FIG. 4 depicts NOx conversion comparison for hydrothermally aged samples (at 900° C. during about 4 hours) of SPGM catalyst systems Type 1 and PGM catalyst system Type 2, under isothermal steady state sweep condition, at inlet temperature of about 450° C., and SV of about 40,000 h$^{-1}$, according to an embodiment.

FIG. 4 depicts NOx conversion comparison 400 for hydrothermally aged samples (at 900° C. during about 4 hours) of SPGM catalyst system Type 1 100; and PGM catalyst system Type 2 200, under isothermal steady state sweep condition, at inlet temperature of about 450° C. and SV of about 40,000 h$^{-1}$, according to an embodiment.

In FIG. 4, NOx conversion curve 402 (solid line) shows performance of SPGM catalyst system Type 1 100, NOx conversion curve 404 (dashed line) depicts performance of PGM catalyst system Type 2 200, under isothermal steady state sweep condition.

As may be observed in NOx conversion comparison 400, disclosed SPGM catalyst system Type 1 100 after hydrothermal aging may perform better than disclosed PGM catalyst system Type 2 200 after same hydrothermal aging, because of their improved NO conversion under rich condition. For example, as shown in FIG. 4, at all R-values region PGM catalyst system Type 2 200 shows no activity on $NO_x$ conversion, this is because Pt catalyst may be passivated by aging treatment (at 900° C. during about 4 hours). Moreover, SPGM catalyst system Type 1 100 shows catalytic activity of about 65.5% at R value of about 1.6 and of about 64% at fully rich condition, R-value of about 2.0. Since Pt may be passivated by the aging treatment (at 900° C. during about 4 hours), the catalytic activity of aged SPGM catalyst system Type 1 100 may be achieved only by the Cu—Mn spinel components in the composition of SPGM catalyst system Type 1 100 in which adding of Cu—Mn spinel components is responsible for the performance of $NO_x$ conversion compared with no $NO_x$ conversion of PGM catalyst system Type 2 200 shown in NOx conversion comparison 400.

Figure 5:
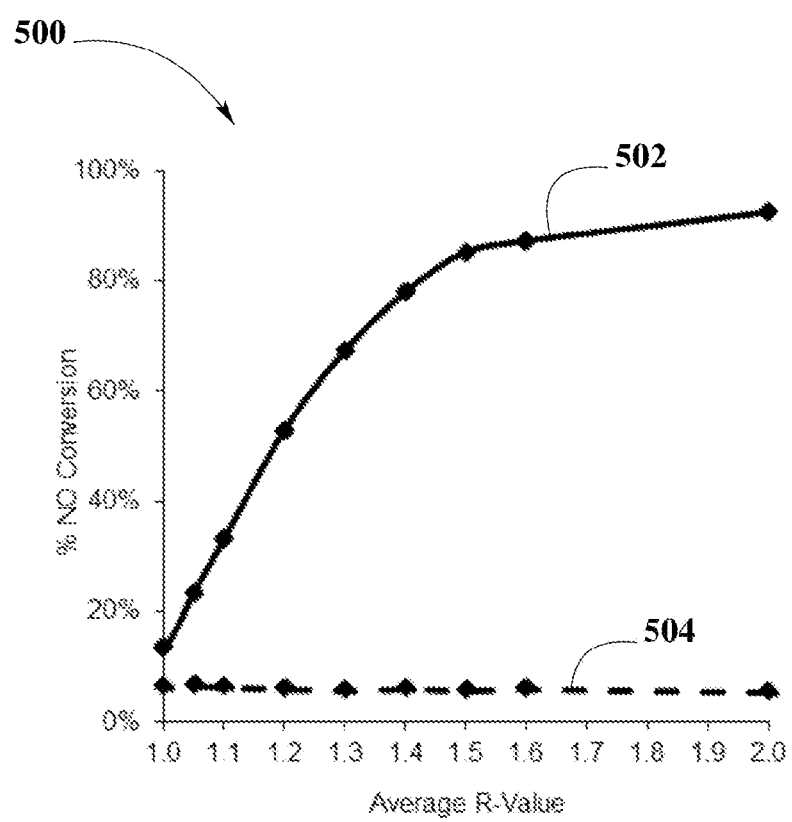
FIG. 5 depicts NOx conversion comparison for fuel cut aged samples (at 800° C. during about 20 hours) of SPGM catalyst systems Type 1 and PGM catalyst system Type 2, under isothermal steady state sweep condition, at inlet temperature of about 450° C., according to an embodiment.

FIG. 5 depicts NOx conversion comparison 500 in $NO_x$ conversion for fuel cut aged samples (aged at 800° C. during about 20 hours) of SPGM catalyst system Type 1 100, and PGM catalyst system Type 2 200, under isothermal steady state sweep condition, at inlet temperature of about 450° C. and SV of about 40,000 h$^{-1}$, according to an embodiment.

In FIG. 5, NOx conversion comparison 500, NOx conversion curve 502 (solid line) shows performance of SPGM catalyst system Type 1 100 after fuel cut aging, NOx conversion curve 504 (dashed line) depicts performance of PGM catalyst system Type 2 200 after fuel cut aging.

As may be observed in NOx conversion comparison 500, disclosed SPGM catalyst system Type 1 100 after fuel cu aging may perform better than disclosed PGM catalyst system Type 2 200 after same fuel cut aging, because of their improved NO conversion under rich condition. For example, as shown in FIG. 5, at all R-values region PGM catalyst system Type 2 200 shows very low activity on NO$_x$ conversion (below about 6.0%), this is because Pt catalyst may be passivated by fuel cut aging treatment (at 800° C. during about 20 hours). Moreover, SPGM catalyst system Type 1 100 shows catalytic activity of about 85% at R value of about 1.6 (rich condition) and of about 92.5% at fully rich condition, R-value of about 2.0. Since Pt may be passivated by the fuel cut aging treatment (at 800° C. during about 20 hours), the catalytic activity of aged SPGM catalyst system Type 1 100 may be achieved only by the Cu—Mn spinel components in the composition of SPGM catalyst system Type 1 100 in which adding of Cu—Mn spinel components is responsible for the performance of NO$_x$ conversion under rich condition compared with no NO$_x$ conversion of PGM catalyst system Type 2 200 shown in NOx conversion comparison 500.

CO Conversion Comparison of SPGM Catalyst System Type 1 and PGM Catalyst System Type 2

Figure 6:
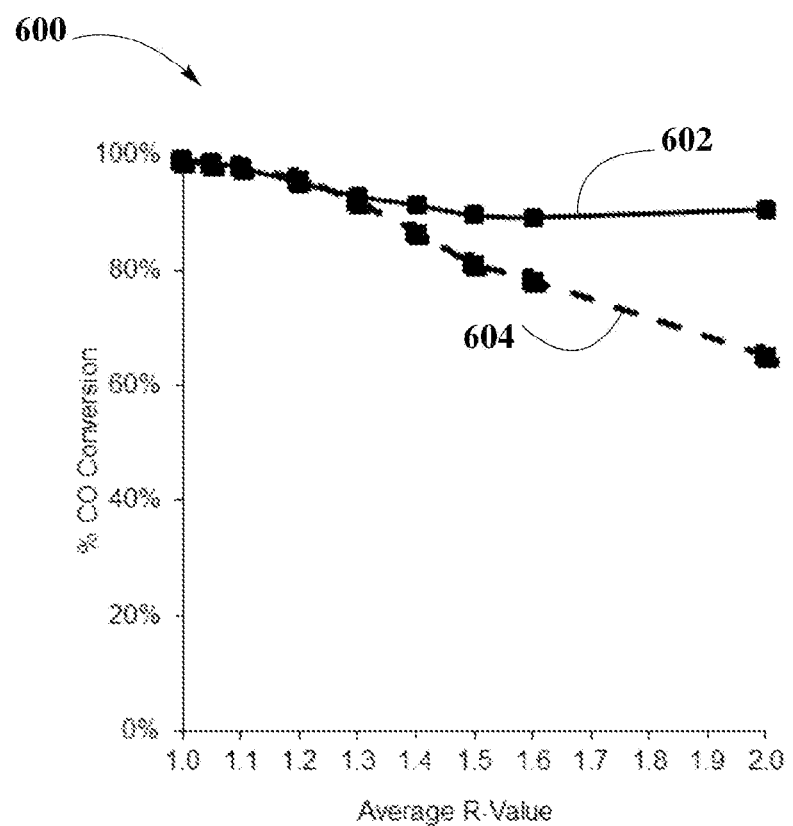
FIG. 6 depicts CO conversion comparison for hydrothermally aged samples (at 900° C. during about 4 hours) of SPGM catalyst systems Type 1 and PGM catalyst system Type 2 under isothermal steady state sweep condition, at inlet temperature of about 450° C., and SV of about 40,000 h$^{-1}$, according to an embodiment.

FIG. 6 depicts CO conversion comparison 600 in CO conversion for fresh samples of SPGM catalyst system Type 1 100, and PGM catalyst system Type 2 200, under isothermal steady state sweep condition, at inlet temperature of about 450° C. and SV of about 40,000 h$^{-1}$, according to an embodiment.

In FIG. 6, CO conversion curve 602 (solid line) shows performance of fresh SPGM catalyst system Type 1 100, CO conversion curve 604 (dashed line) depicts performance of fresh PGM catalyst system Type 2 200, under isothermal steady state sweep condition.

As may be observed in CO conversion comparison 600, disclosed SPGM catalyst system Type 1 100 may perform better than disclosed PGM catalyst system Type 2 200, because of their improved CO conversion under rich condition. For example, as shown in FIG. 6, at fully rich condition, R-value of about 2.0, while SPGM catalyst system Type 1 100 shows CO conversion of about 90.6%, PGM catalyst system Type 2 200 shows CO conversion of about 65.3%.

As may be observed in CO conversion comparison 600, for fresh samples there is an improved performance in CO conversion for disclosed SPGM catalyst system Type 1 100, under rich condition as compared to PGM catalyst system Type 2 200. This improved performance of SPGM catalysts is the result of the synergistic effect between Pt, and the Cu—Mn spinel components in the respective composition of SPGM catalyst system Type 1 100, in which adding the Cu—Mn spinel components is responsible for the improved performance of CO conversion under rich condition compared to the level of CO conversion of PGM catalyst system Type 2 200, shown in CO conversion comparison 600.

In addition, samples of fresh SPGM catalyst system Type 1 100 and of fresh PGM catalyst system Type 2 200 present CO conversion of about 100% at R-value of about 1.00, which is the stoichiometric R-value for PGM catalysts.

Figure 7:
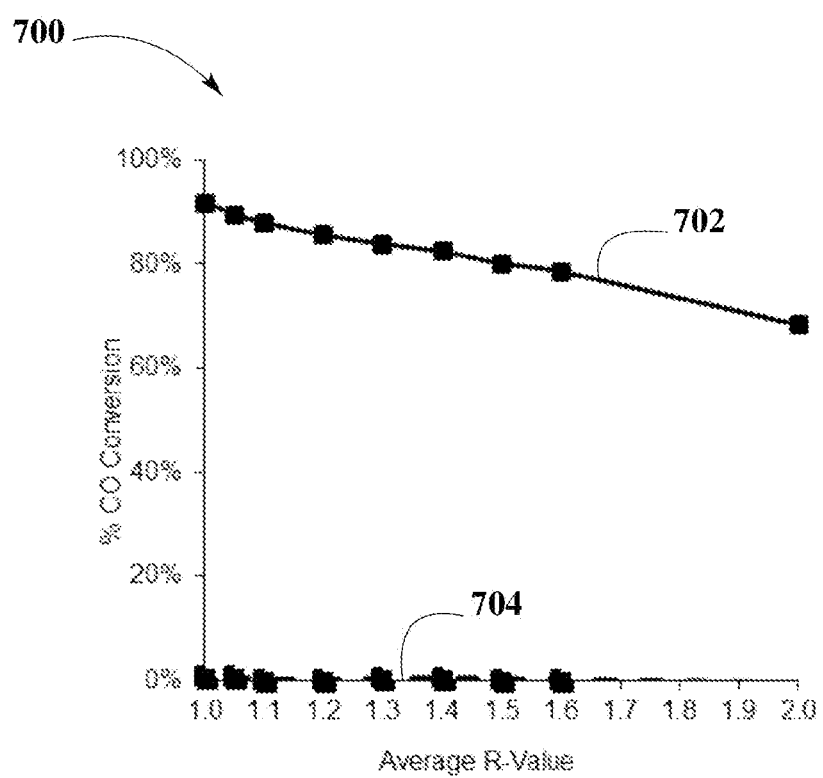
FIG. 7 depicts CO conversion comparison for fuel cut aged samples (at 800° C. during about 20 hours) of SPGM catalyst systems Type 1 and PGM catalyst system Type 2, under isothermal steady state sweep condition, at inlet temperature of about 450° C., and SV of about 40,000 h$^{-1}$, according to an embodiment.

FIG. 7 depicts CO conversion comparison 700 in CO conversion for hydrothermal aged samples (aged at 900° C. during about 4 hours) of SPGM catalyst system Type 1 100, and PGM catalyst system Type 2 200, under isothermal steady state sweep condition, at inlet temperature of about 450° C. and SV of about 40,000 h$^{-1}$, according to an embodiment.

In FIG. 7, CO conversion curve 702 (solid line) shows performance of SPGM catalyst system Type 1 100 after hydrothermal aging, CO conversion curve 704 (dashed line) depicts performance of PGM catalyst system Type 2 200 after hydrothermal aging, under isothermal steady state sweep condition.

As may be observed in CO conversion comparison 700, disclosed SPGM catalyst system Type 1 100 after hydrothermal aging may perform better than disclosed PGM catalyst system Type 2 200 after same aging, because of their improved CO conversion under rich condition. For example, as shown in FIG. 7, at all R-values region PGM catalyst system Type 2 200 shows no activity on CO conversion, this may be because Pt catalyst may be passivated by aging treatment (at 900° C. during about 4 hours). Moreover, SPGM catalyst system Type 1 100 shows catalytic activity of about 78.5% at R value of about 1.6 and of about 68.3% at fully rich condition, R-value of about 2.0. Since Pt may be passivated by the aging treatment, the catalytic activity of aged SPGM catalyst system Type 1 100 may be achieved only by the Cu—Mn spinel components in the composition of SPGM catalyst system Type 1 100 in which adding the Cu—Mn spinel components is responsible for the performance of CO conversion under rich condition compared to no CO conversion of PGM catalyst system Type 2 200, shown in CO conversion comparison 700.

SPGM catalyst system of the present disclosure, which is suitable for TWC application, may show significant improvement in nitrogen oxide conversion under lean operating conditions, in which synergistic effect between Pt and Cu—Mn spinel is responsible for such improvement. Furthermore, disclosed SPGM catalyst system that includes a Cu—Mn spinel may enable the use of a catalyst converter that includes very low amounts of PGM. Furthermore, synergistic effect of Cu—Mn on Pt results is improvement of CO conversion under both lean and rich condition. The improvement is more significant under rich condition. In addition, the significant improvement of NO and CO conversion under lean-rich condition of disclosed SPGM catalyst after hydrothermal and fuel cut aging shows thermal stability of disclosed SPGM catalyst systems, in which ZPGM component, Cu—Mn spinel, is responsible for such stability.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A synergized platinum group metal (SPGM) catalyst system, comprising: at least one substrate;
    at least one washcoat comprising at least one oxygen storage material further comprising Cu—Mn spinel having a niobium-zirconia support oxide; and at least one overcoat comprising at least one platinum group metal catalyst and Al$_2$O$_3$; wherein the at least one platinum group metal catalyst has a concentration of about 6 g/ft$^3$ to about 1 g/ft$^3$; and wherein NOx conversion is higher as compared to a platinum group metal catalyst having substantially no Cu—Mn spinel.

2. The catalyst system of claim 1, wherein the Cu—Mn spinel comprises CuMn$_2$O$_4$.

3. The catalyst system of claim 1, wherein the Cu—Mn spinel is stoichiometric.

4. The catalyst system of claim 1, wherein the niobium-zirconia support oxide comprises Nb$_2$O$_5$—ZrO$_2$.

5. The catalyst system of claim 1, further comprising at least one impregnation layer.

6. The catalyst system of claim 1, wherein the at least one substrate comprises a ceramic.

7. The catalyst system of claim 1, wherein the conversion of NO$_x$ is substantially complete under lean exhaust conditions.

8. The catalyst system of claim 1, wherein the conversion of CO is substantially complete under lean exhaust conditions.

9. The catalyst system of claim 1, wherein the conversion of NO$_x$ is about 91% under lean exhaust conditions.

10. The catalyst system of claim 1, wherein the NO$_x$ R-value is about 0.950.

11. The catalyst system of claim 1, wherein the NO$_x$ R-value is about 1.0.

12. The catalyst system of claim 1, wherein the niobium-zirconia support oxide comprises about 15% to about 30% by weight Nb$_2$O$_5$.

13. The catalyst system of claim 1, wherein the niobium-zirconia support oxide comprises about 25% by weight Nb$_2$O$_5$.

14. The catalyst system of claim 1, wherein the niobium-zirconia support oxide comprises about 70% to about 85% ZrO$_2$.

15. The catalyst system of claim 1, wherein the niobium-zirconia support oxide comprises about 75% ZrO$_2$.

* * * * *